United States Patent [19]

Umiker

[11] Patent Number: 5,395,010

[45] Date of Patent: Mar. 7, 1995

[54] PLASTIC BOTTLE CASE

[75] Inventor: Hans Umiker, Egg/ZH, Switzerland

[73] Assignee: Schoeller International Engineering KG, Switzerland

[21] Appl. No.: 194,750

[22] Filed: Feb. 10, 1994

Related U.S. Application Data

[63] Continuation of Ser. No. 10,442, Jan. 22, 1993, abandoned, which is a continuation of Ser. No. 939,401, Sep. 1, 1992, abandoned, which is a continuation of Ser. No. 536,607, Aug. 28, 1990, abandoned.

[30] Foreign Application Priority Data

Nov. 8, 1988 [DE] Germany .......................... 38 37 894.9
Nov. 18, 1988 [DE] Germany .......................... 38 39 087.6

[51] Int. Cl.⁶ ............................................. B65D 1/24
[52] U.S. Cl. ..................................... 220/771; 220/516; 220/675; 206/203
[58] Field of Search ............... 220/516, 517, 771, 509, 220/669, 675; 206/203

[56] References Cited

U.S. PATENT DOCUMENTS

| 3,160,306 | 12/1964 | Smalley | 206/203 X |
| 3,506,154 | 4/1970 | Barnes | 220/516 X |
| 4,029,209 | 6/1977 | Frahm et al. | 206/203 X |
| 4,067,474 | 1/1978 | Prodel | 220/516 |
| 4,308,966 | 1/1982 | Ettema | 220/516 |
| 4,378,328 | 3/1983 | Przytulla et al. | 220/675 X |
| 4,549,672 | 10/1985 | Rinkewich | 220/669 X |
| 4,597,503 | 7/1986 | Lates | 220/516 X |
| 4,846,365 | 7/1989 | Steinlein | 220/516 |

FOREIGN PATENT DOCUMENTS

| 0289230 | 10/1989 | European Pat. Off. . |
| 2223248 | 10/1974 | France . |
| 0973724 | 10/1964 | United Kingdom | 220/516 |
| 2158002 | 11/1985 | United Kingdom . |

Primary Examiner—Steven M. Pollard
Attorney, Agent, or Firm—Remy J. VanOphem; John VanOphem

[57] ABSTRACT

In a plastic bottle case having four side walls (4), bottom and at least one handle formed in a side wall, hollow reinforcing channels (6) closed along their periphery are formed by gas injection in the bottle case at least in certain areas.

6 Claims, 5 Drawing Sheets

PLASTIC BOTTLE CASE

This is a continuation of application Ser. No. 08/010,442, filed Jan. 22, 1993, now abandoned, which is a continuation of Ser. No. 07/939,401, filed Sep. 1, 1992, now abandoned, which is a continuation of Ser. No. 07/536,607, filed Aug. 28, 1990, now abandoned.

BACKGROUND OF THE INVENTION

The present invention relates to a plastic bottle case and to a method for producing such a case.

Plastic bottle cases usually consist of two narrow side walls, two long side walls and an open structured bottom, whereby a division of compartments preferably having intersecting compartment walls is optionally disposed within the case. For carrying, such bottle cases generally have handles formed by simple reach-through openings in the case. A horizontally extending bar serving as a horizontal handle is limited between the upper edge of the case and the lower edge of the opening.

Such horizontal handles are usually produced as U-, C- or L-shaped profiles. Apart from the fact that these handle profiles do not allow for comfortable carrying, their durability leaves much to be desired. The handles may tear out in particular if cases filled with full bottles are frequently handled.

The invention is based on the problem of producing a plastic bottle case which has a very high torsional rigidity in the area of the handles, in particular in the area of horizontal handles, whereby the durability is increased to prevent the handles from tearing out even under heavy loads. In spite of their high torsional rigidity, the bottle cases produced should also have smooth outer surfaces suitable for printing. Finally, the carrying comfort of such cases should be increased.

SUMMARY OF THE INVENTION

According to the invention, no use is made of the open profile shape used in the prior art. When the bottle case is produced, gas is selectively injected under pressure into the molten stream of material for molding the case to obtain a cavity formation within the material of the case, so that hollow sections form at desired places in the case. The cavities or hollow channels are expediently closed off from the outside.

In the area of the handles such a cavity, which is enclosed along the periphery by the material of the case wall, allows for a most torsionally rigid formation of a handle that can be realized in a box shape and thus as a closed profile, which greatly increases the carrying comfort, largely prevents dirt from collecting and, conversely, allows for easy cleaning of the bottle case. Selective injection of hollow channels into critical areas of the bottle case also allows for the rigidity of the case to be increased. For example, it is expedient to give a hollow design to the corner profiles of the case or to vertically extending support profiles molded onto the side walls. This design makes it possible to avoid rib structures, thereby; simplifying the cleaning of the bottle case. The absence of rib structures ensures largely smooth outer surfaces which simplify the cleaning of the case, facilitate handling and increase the carrying comfort if the handle surfaces are also smooth.

In the case of ribs on the side walls, gas is injected in the area of the longitudinal and/or transverse ribs. This results in good rigidity values for the case and ensures a very soft transition from the rib into the inside surface of the case, which is advantageous for the cleaning of the case and also largely prevents dirt from collecting.

Side walls of the bottle case can each be advantageously formed with closed hollow chambers which are obtained by injecting gas into the molten plastic during molding. The air can be injected from the side edges, i.e. from the corner areas, or from the underside of the case. However, it may also be expedient to inject the case conversely, which is advantageous in particular for forming horizontal handles with closed cavities.

According to the invention, cavities can be formed selectively in bottle cases by simultaneous or time-delayed injection of gas into the molten mass, whereby the cavities are not visible from the outside. The gas is injected into the molten plastic through very small nozzles. By appropriate arrangement and orientation of the nozzles one can selectively influence the cavity,formation.

In order to prevent the cavities formed on the case wall from swelling, it is advantageous to provide vent holes at appropriate places to ensure a controlled reduction of the gas overpressure.

The nozzles are disposed in such a way that they are stationary with the tool, and the finished bottle case is raised off the nozzles when being removed from the tool. However, the nozzles may be movably disposed and advanced for the injection of the gas so that they extend into the fused mass. At the end of the flow process the nozzles are withdrawn so that these small injection openings close automatically. This allows for simple realization of hollow channels closed at the ends. The nozzles are preferably disposed as close as possible to the desired cavity.

According to the invention it is possible to selectively obtain cavities which contribute to increasing the torsional rigidity and the breaking strength of the bottle case, particularly in the handle area. At the same time, it is no longer necessary to optimize the strength of the handle by giving it the shape of a U, C, L or other profile, which is undesirable in terms of carrying comfort. Instead, a self-contained box profile can be realized in a compact design in the area of the handle, which allows for comfortable gripping of the handle by a person's hand. A further advantage of this selective cavity formation in the handle area is that the cavities can be extended into the rest of the wall of the bottle case, thereby continuing the strength into the rest of the wall and increasing the breaking strength of the handle. The injection of gas also leads to a saving of material during production of the bottle case.

Preferred exemplary embodiments of the invention will be described with reference to the accompanying drawings.

DETAILED DESCRIPTION OF THE PREFERRED EMBODIMENT

Figure 1:
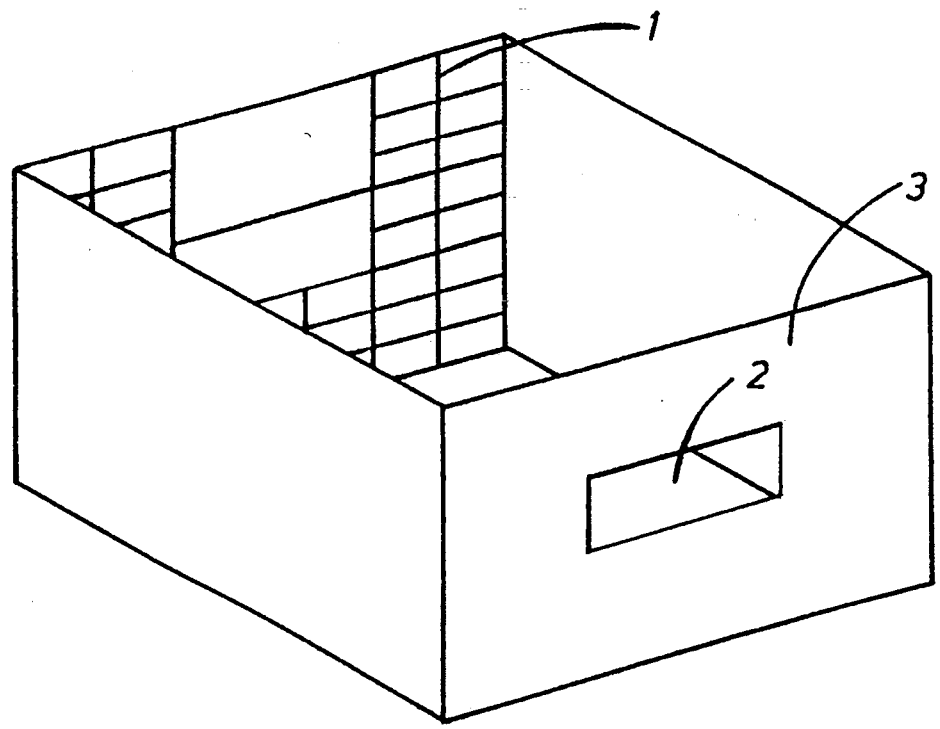
FIG. 1 shows a perspective view of the bottle case with horizontal handles in the side walls and reinforcing ribs on the inside wall of the case.
Figure 2:
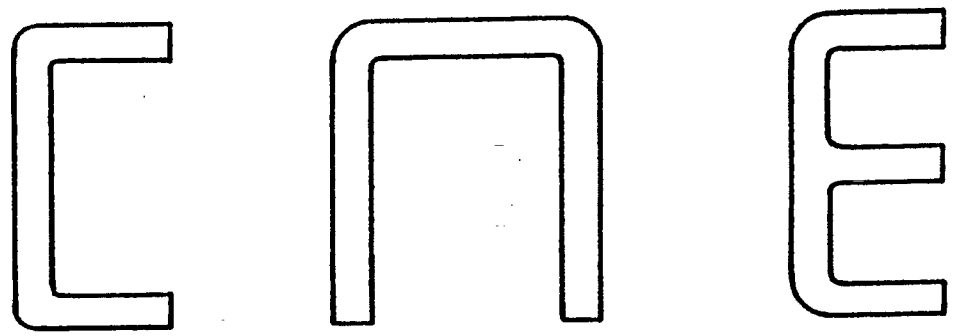
FIG. 2 shows various cross-sectional views of conventional handles.
Figure 3:
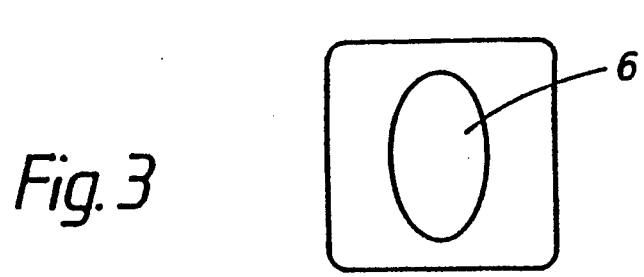
FIG. 3 shows a corresponding cross section of an inventive embodiment of a handle.

FIG. 1 shows a strictly schematic view of a bottle case having reach-through openings 2 formed in the side walls, whereby the cross bar remaining above the reach-through openings 2, which at the same time forms the upper edge of the case, constitutes an actual handle 3 of the bottle case. FIG. 1 also shows, in strictly schematic fashion, vertically and horizontally extending ribs 1 on one inside wall of the bottle case, which serve to increase the torsional rigidity of the bottle case. FIG. 2 shows conventional profile shapes of handles, whereas FIG. 3 shows a cross section of a handle 3, illustrating the shape of a hollow channel 6. As FIG. 3 shows, the cross-sectional shape of the hollow channel is preferably oval, but may also be circular depending on the embodiment.

Figure 4:
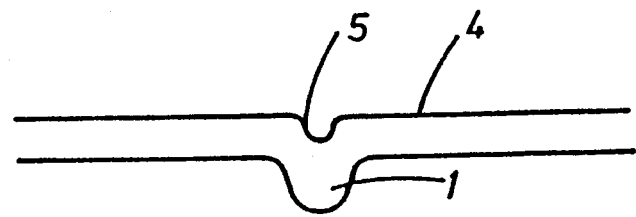
FIG. 4 shows a cross-sectional view of a conventionally molded reinforcing rib in a side wall of the bottle case.
Figure 5:
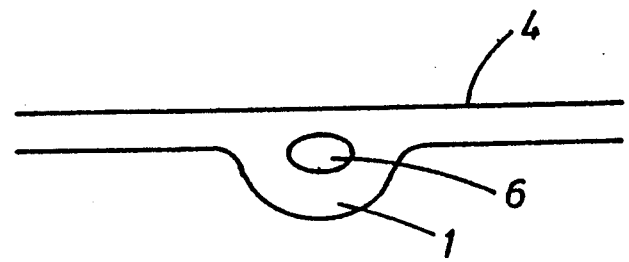
FIG. 5 shows a cross-sectional view of the embodiment of a rib according to the invention.
Figure 6:
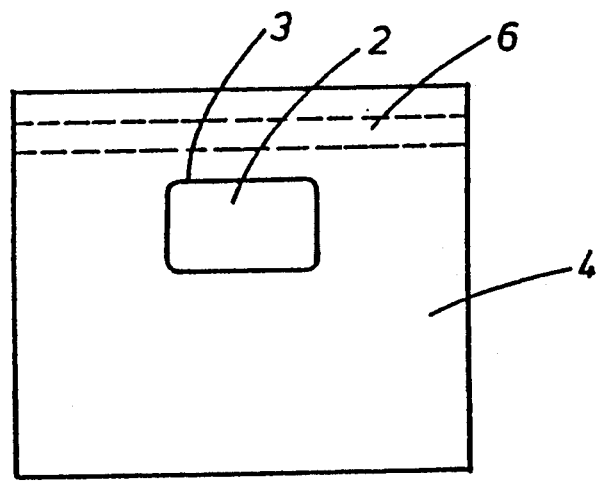
FIG. 6 shows a preferred direction of gas injection to form a cavity in a handle.
Figure 7:
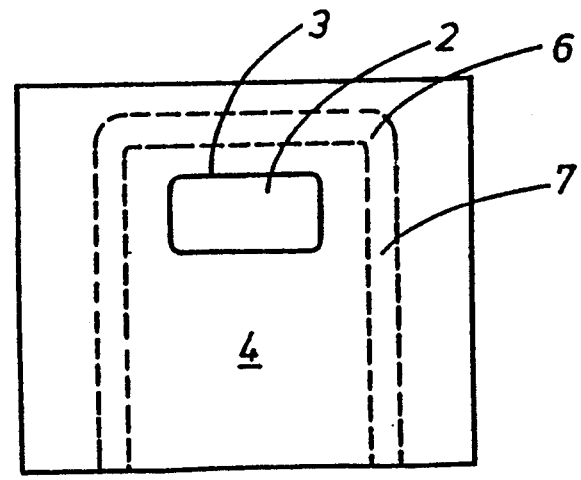
FIG. 7 shows a side wall of the case with a U-shaped hollow channel.
Figure 8:
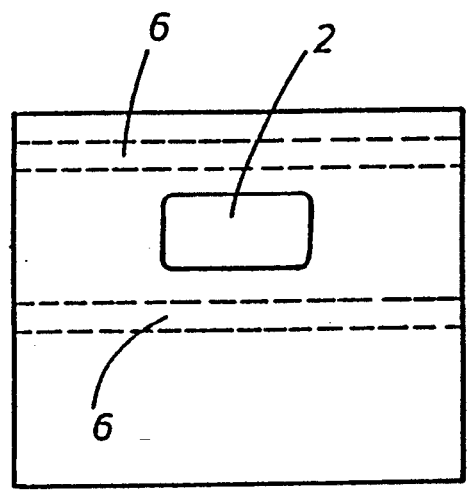
FIGS. 8 and 9 show further embodiments of cavity formations in bottle cases.
Figure 9:
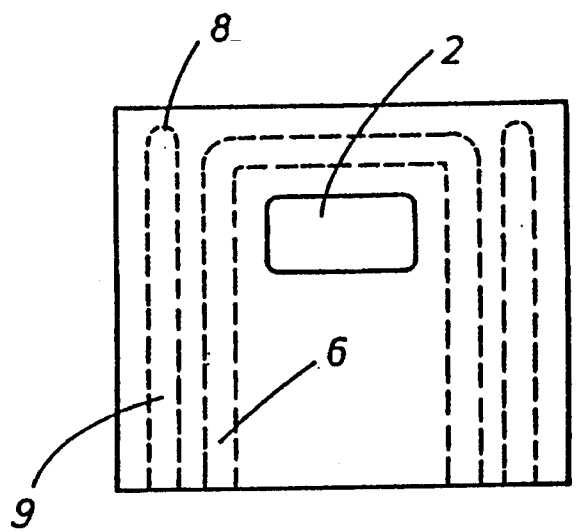

FIG. 4 shows a conventional rib formation in a side wall 4, clearly indicating a sink mark 5 which comes about due to the different collection of material in the rib area during cooling of the molded bottle case. FIG. 5 shows a rib formation 1 whereby reinforcement is obtained by the channel 6 produced by gas injection. The hollow channel 6 extends substantially over the entire length of the rib 1. FIG. 6 shows a side view of a bottle case with a handle 3 above a reach-through opening 2, whereby the hollow channel 6 produced by gas injection is formed over the entire length of the side wall 4 on the upper edge. The hollow channel 6 is shown by broken lines. It extends from one end of the side wall to the other and was produced by lateral injection of gas during the molding of the bottle case. In particular, the hollow channel 6 extends through the handle 3, resulting in a handle formation as depicted in FIG. 3. In the embodiment of FIG. 7, the gas is injected from the bottom of the case, the gas stream being directed in a U shape so that a U-shaped hollow channel 6 forms, resulting in a hollow formation of the handle 3 and a reinforcement of the side wall 4 of the case due to hollow legs 7 of the U-shaped hollow channel 6. This produces a handle construction that is very difficult to tear out. In the embodiment of FIG. 8, two hollow channels 6 are formed, one on each side of the reach-through opening 2, which results in very high torsional rigidity of the bottle case, in particular in the handle area. Such an embodiment is also particularly suitable for bottle cases having relatively large openings in the side wall which serve as viewing areas for the bottles contained in the case. It is expedient to orient the hollow channels 6 along the edges of the window-like openings. In the embodiment of FIG. 9, a U-shaped hollow channel 6 is formed. The corner areas of the bottle case are reinforced by vertically extending hollow channels 9, whereby these channels may be closed at the top, indicated at 8, but open at the bottom. In the case of the U-shaped hollow channel 6, however, both lower ends opening into the bottom are preferably closed, which also applies to the ends of the hollow channel 6 shown in FIGS. 6, 7 and 8.

Figure 10:
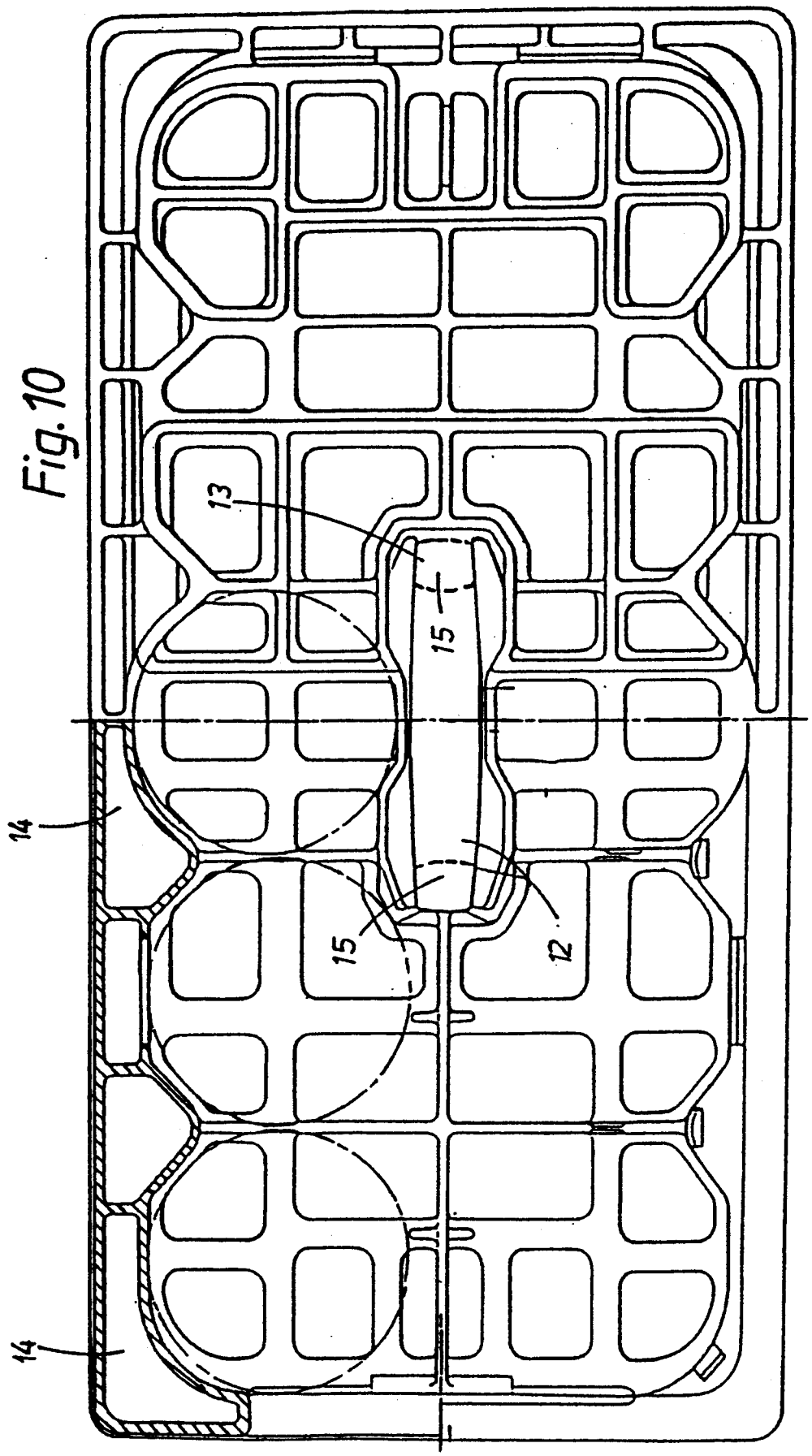
FIGS. 10 and 11 show a further embodiment of the bottle case of the present invention, FIG. 10 showing a top view and FIG. 11 a cross section of FIG. 10.

FIG. 10 shows a bottle case with a middle handle, of which a cross bar 12 serving as :the handle is shown in FIG. 10. The middle handle extends upward either from the bottom of the case or from the compartment walls in the form of two opposite support legs 1S which open into the substantially horizontal cross bar 12 and are formed in one piece therewith and with the rest of the case.

Figure 11:
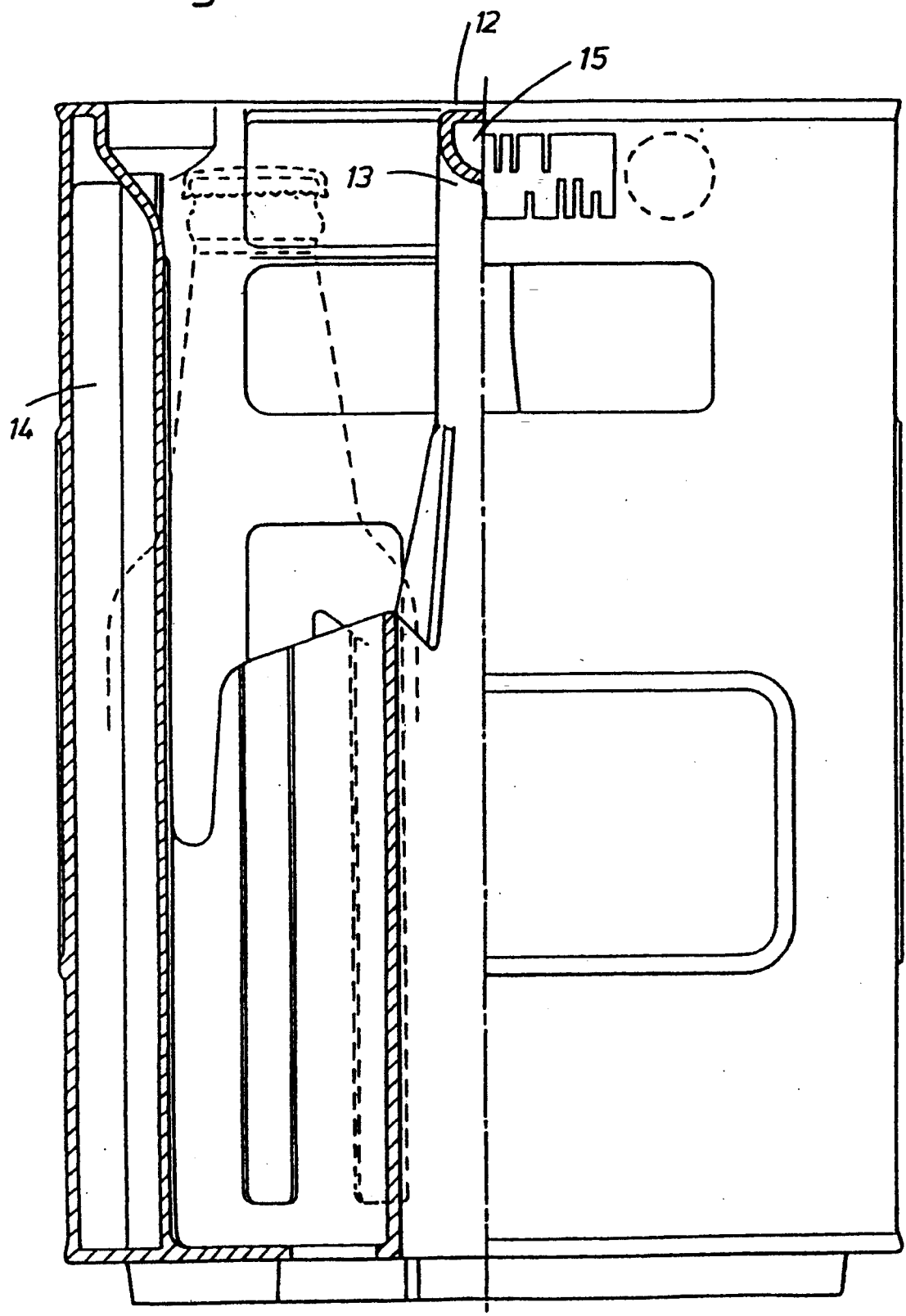

In the embodiment shown, the middle handle is formed as a closed hollow section over its entire length, i.e. over the length of the two support legs 13 and the length of the cross bar 12 connecting the two support legs, as can be seen in particular from the cross section of the cross bar 12 in FIG. 11. At its ends, i.e. in the area where the middle handle opens into the bottom of the case or into the compartment walls, the hollow section 15 of the middle handle may be either of closed or of open design.

The hollow section 15 is produced by injecting gas into the molten mass during the molding of the bottle case, whereby the gas flows in the ductile core of the molded part to form the middle handle without mixing with the material, so that the hollow section 15 forms within the middle handle due to the injected gas cushion.

The hollow section 15 is closed at both ends of the middle handle, i.e. in the area where it opens into the bottom and the walls of the case, by either withdrawing the nozzle before the molten material solidifies, or withdrawing the molding box from the nozzle, i.e. from the tool as a whole, before the molten material solidifies. The cavity can also be closed by other suitable measures.

It is also expedient to form the hollow section 15 only in certain areas, in particular to form a cavity in the cross bar 12, whereby this cavity may extend a certain distance into the edge area of the adjacent vertical support legs 13. It is also expedient to form a cavity substantially in the area of the vertical support legs 13, whereby the cavity is also advantageously drawn slightly into the adjacent area of the cross bar 12. In the case of a cavity formation in both support legs 13, gas may be injected from both sides of the middle handle. In a suitable embodiment, the gas was injected at a pressure in the range of 200 bar.

In addition to the middle handle formed with a cavity, one may also provide hollow sections by gas injection in the area of the case walls, such as the vertical hollow sections 14 shown in the corners and the support profiles of the case, as shown in longitudinal section in FIG. 11 and in cross-section in FIG. 10.

The formation of hollow sections that are closed in particular on all sides and also at the ends results not only in a saving of material during production of bottle cases, but also in a substantial reinforcement and stabilization, and increases the durability of the handles, reducing the likelihood of the handles tearing out.

While the invention has been described in terms of a preferred embodiment, it is apparent that other forms could be adopted by one skilled in the art. Accordingly, the scope of the invention is to be limited only by the following claims.

What is claimed is:

1. A molded plastic bottle carrying case comprising: at least four upright plastic solid Walls;

a bottom wall attached to said at least four upright plastic solid walls;

at least one handle defining an opening integrally formed with a first wall of said at least four upright plastic solid walls, said opening defining an upper region located between said opening and an upper edge of said first wall of said at least four upright plastic solid walls and a lower region located between said opening and a lower edge of said first wall of said at least four upright plastic solid walls; and a hollow gas injected reinforcing channel only in said upper region of said first wall of said at least four upright plastic solid walls, whereby said hollow gas injected reinforcing channel provides substantial reinforcement of said at least one handle thereby preventing said at least one handle from tearing out of said first wall of said at least four upright plastic solid walls when lifting said plastic bottle case by said at least one handle.

2. The molded plastic bottle carrying case of claim 1 wherein said hollow gas injected reinforcing channel has a first end and a second end opposite said first end, said first and second ends being closed to define an internal cavity.

3. The molded plastic bottle carrying case of claim 1 further comprising a plurality of hollow reinforcing channels disposed in said at least four upright plastic solid walls, each of said plurality of hollow reinforcing channels extending substantially across a corresponding one of said at least four upright plastic solid walls.

4. A molded plastic bottle carrying case comprising:
at least four upright solid walls;
a bottom wall attached to said at least four upright solid walls;
a carrying handle integrally molded with said plastic bottle carrying case, said carrying handle extending upwardly from a central portion of said plastic bottle carrying case, said carrying handle being formed in the shape of an inverted U, said carrying handle comprising two support legs and a cross bar interposed said two support legs such that said cross bar serves as a carrying grip, said two support legs and said cross bar having a closed profile; and
a hollow closed gas injected reinforcing channel in said cross bar extending for a length at least equal to the length of said cross bar whereby said hollow closed gas injected reinforcing channel provides substantial reinforcement of said cross bar resulting in preventing said carrying handle from tearing out from said two support legs when lifting said plastic bottle carrying case by said carrying handle.

5. The molded plastic bottle carrying case of claim 4 wherein said hollow closed gas injected reinforcing channel has a first end and a second end opposite said first end, said first and second ends being closed to define an internal cavity.

6. The molded plastic bottle carrying case of claim 4 further comprising a plurality of hollow reinforcing channels disposed in said at least four upright solid walls, each of said plurality of hollow reinforcing channels extending substantially across a corresponding one of said at least four upright solid walls.

* * * * *

UNITED STATES PATENT AND TRADEMARK OFFICE
CERTIFICATE OF CORRECTION

PATENT NO. : 5,395,010
DATED : March 7, 1995
INVENTOR(S) : Hans Umiker

It is certified that error appears in the above-indentified patent and that said Letters Patent is hereby corrected as shown below:

```
Title page, item [57], line 1, before "bottom" insert ---- a ----.

Column 1, line 60, delete ---- ; ----.

Column 2, line 17, delete ---- , ----.

Column 3, line 6, after ";" insert ---- and ----.

Column 4, line 4, delete ---- : ----.

Column 4, line 7, delete "1S" insert ---- 13 ----.

Column 4, line 68, delete "Walls" insert ---- walls ----.
```

Signed and Sealed this

Fourth Day of July, 1995

Attest:

BRUCE LEHMAN

*Attesting Officer*      *Commissioner of Patents and Trademarks*